United States Patent
Urano et al.

(10) Patent No.: US 6,202,158 B1
(45) Date of Patent: Mar. 13, 2001

(54) DETECTION METHOD OF ILLEGAL ACCESS TO COMPUTER SYSTEM

(75) Inventors: Akihiro Urano, Fujisawa; Toshiaki Hirata, Kashiwa; Shuji Fujino, Ebina, all of (JP); Shinji Morita, Lexington, MA (US); Mitsugu Yamada, Yokohama (JP); Miki Niimura, Ebina (JP); Kazuyoshi Morikawa, Chigasaki (JP); Satoshi Miyazaki, Yamato (JP)

(73) Assignees: Hitachi, Ltd.; Hitachi Information Network, Ltd., both of Tokyo (JP)

( * ) Notice: Under 35 U.S.C. 154(b), the term of this patent shall be extended for 0 days.

(21) Appl. No.: 09/058,177

(22) Filed: Apr. 10, 1998

(30) Foreign Application Priority Data

Apr. 11, 1997 (JP) .................................... 9-093438

(51) Int. Cl.$^7$ ..................................................... G06F 15/00
(52) U.S. Cl. ........................................... 713/201; 713/202
(58) Field of Search .................... 713/200, 201, 713/202; 709/225; 380/4

(56) References Cited

U.S. PATENT DOCUMENTS 4,962,449 * 10/1990 Sclhlesinger ........................ 713/200
5,488,715 * 1/1996 Wainwright .............................. 714/4

FOREIGN PATENT DOCUMENTS 6-6347 * 1/1994 (JP) .
7-264178 * 10/1995 (JP) .

OTHER PUBLICATIONS

On–Line Manual, Login (1), HP–UX 90.*
User account Security, Windows NT 3.5, Security/superintendence Guide, Microsoft Corportation.*

* cited by examiner

Primary Examiner—Robert W. Beausoliel, Jr.
Assistant Examiner—Bryce P. Bonzo
(74) Attorney, Agent, or Firm—Antonelli, Terry, Stout & Kraus, LLP

(57) ABSTRACT

A detection method of an illegal access to a computer system includes a step a) of collating user identification information inputted from an input unit in one or more log-in operations with user authentication information registered in the computer system, a step b) of detecting the number of times that the identification information is not coincident with the authentication information in a series of log-in operations within a predetermined term, a step c) of obtaining final log-in information indicating whether the identification information is coincident with the authentication information or not in a final log-in operation, and a step d) of comparing the number of times in respect to the incoincidence and the final log-in information with a predetermined judgment standard to thereby detect the presence of the illegal access.

16 Claims, 9 Drawing Sheets

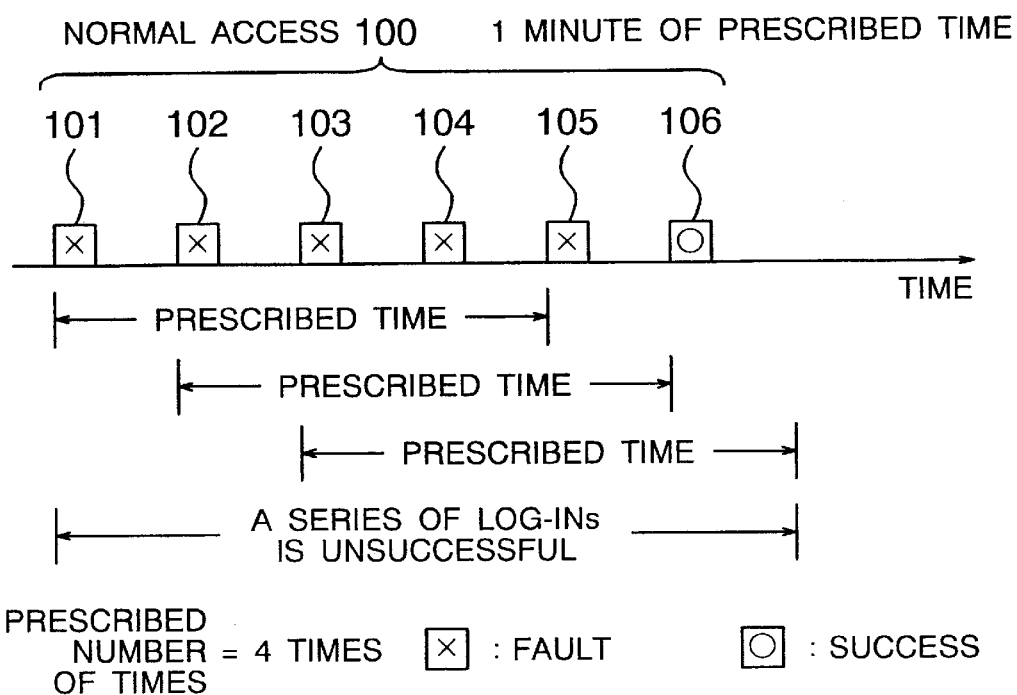
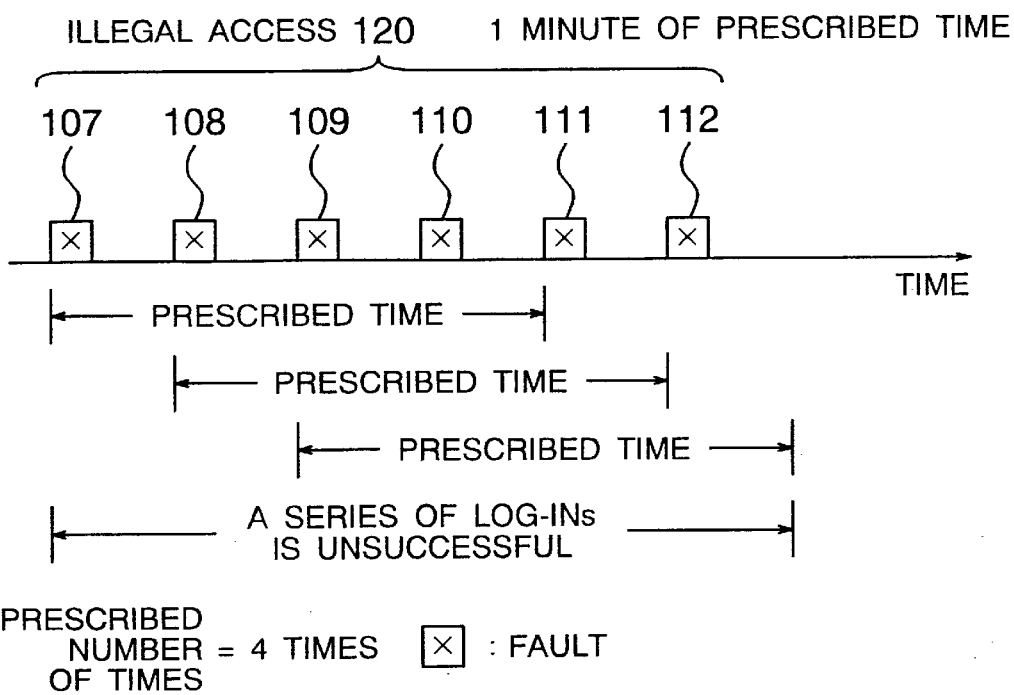

FIG. 7
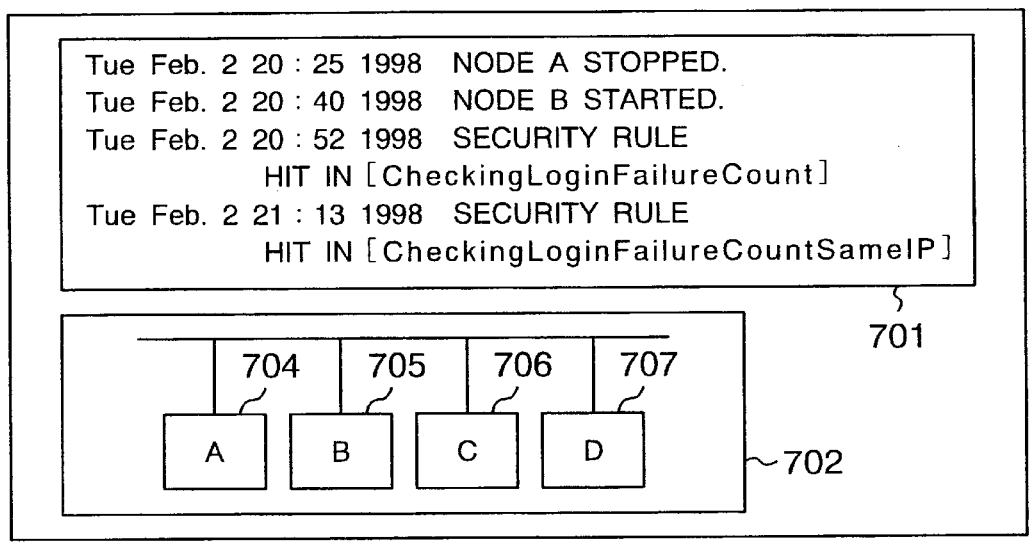
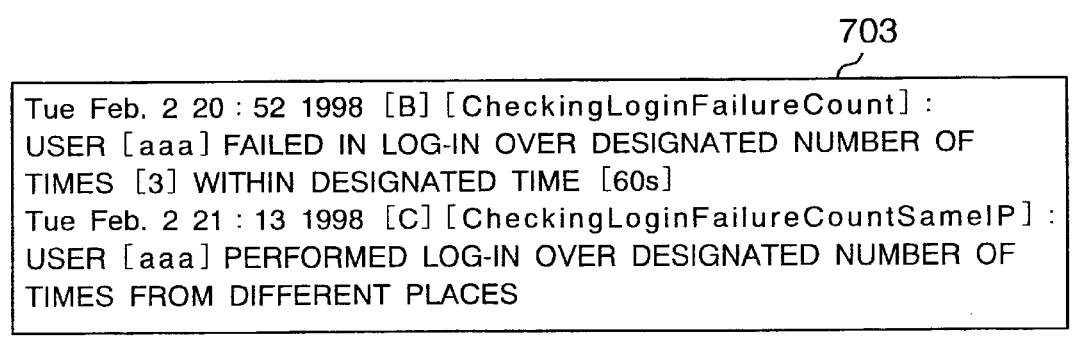

FIG. 8

| 801 | 802 | 803 | 804 | 805 | 806 |
|---|---|---|---|---|---|
| DISCRIMI-NATION BETWEEN LOG-IN AND LOG-OUT | TIME | USER'S NAME | SUCCESS OR FAILURE OF LOG-IN | NAME OF LOG-IN COMPUTER | NAME OF INPUT COMPUTER |

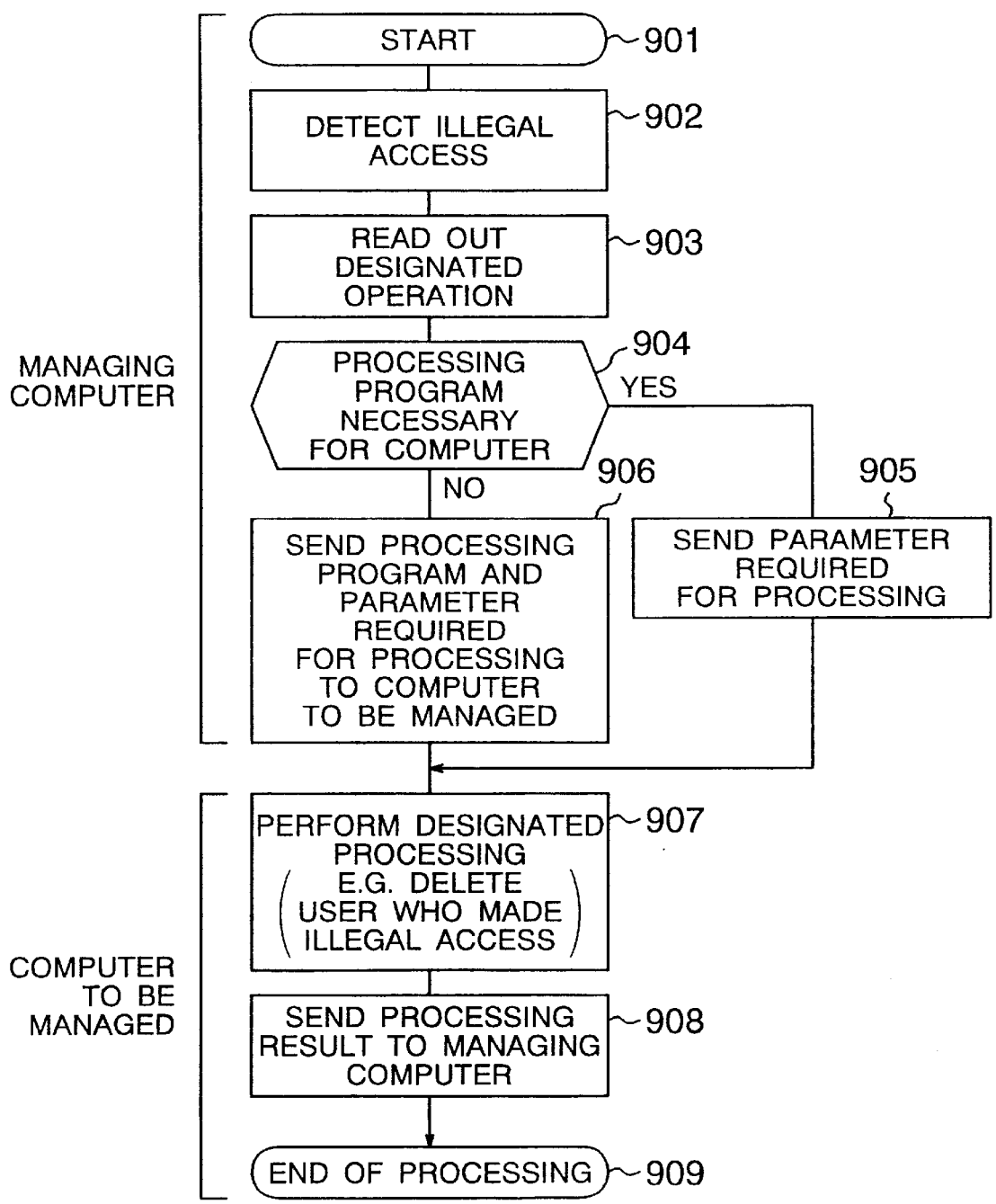

DETECTION METHOD OF ILLEGAL ACCESS TO COMPUTER SYSTEM

BACKGROUND OF THE INVENTION

The present invention relates to a personal authentication method relative to an operator of a computer system and more particularly to a computer system which performs authentication on the basis of the fact that a password inputted from an input unit such as a keyboard is equal to a previously registered password.

In order to authenticate whether a user has the right to operate a computer system or not when the user operates the computer system a system is widely used in which the user is caused to input a password from the keyboard or the like and which performs authentication on the basis of the fact that the inputted password is equal to a previously registered password. This authentication is heretofore utilized as detection measures of illegal utilization of a computer system. For example, as described in ON-LINE MANUAL, Login (1) of HP-UX 90, when incorrect passwords are inputted by a prescribed number of times such as three times continuously or when the authentication is not completed during a prescribed time such as, for example, one minute, connection between the terminal and the computer system is cut off and the event thereof is recorded. As described in Paragraph 2.2 Security Function "User Account Security" of Windows NT 3.5 Security/Superintendence Guide (written by Microsoft Corporation, editorially translated by ASCII Network Technology, translated by ASCII Techwrite and published by ASCII, ISBN4-1017-7), when an incorrect pass word is input by a prescribed number of times or more continuously, the occurrences are recorded and are notified to a supervisor or manager.

Further, information relative to a terminal operated by a user is recorded, while the information is not utilized for detection of an illegal access. In the TCP wrapper which is a free software available from ftp://ftp.aistnara.ac.jp/pub/Security/tools/tcp_wrappers on the Internet, for example, utilization by specific terminals or other terminals except specific terminals is judged as illegal.

Furthermore, Japanese Patent Application laid-open No. JP-A-6-6347 discloses a method of monitoring the security on a network concentratedly.

Moreover, Japanese Patent Application laid-open No. JP-A-7-264178 discloses a system which specifies a place on a LAN of occurrence of an illegal access by means of information obtained from a relay apparatus.

The above-described conventional methods have the following problems.

In the system in which if a user fails in log-in even once the failure is adapted to be recorded, a failure is recorded even when a just user inputs a wrong password. It is difficult for a manager to judge whether the failure is caused by illegal utilization or merely wrong inputting.

When an illegal user inputs wrong passwords by the number of times (for example, two times) smaller than a prescribed number of times continuously in the method that connection is cut off if a user inputs wrong passwords by the prescribed number of times (for example, three times) continuously or when an illegal user cuts off connection by himself within a time shorter than a prescribed time (for example, one minute) in the method that connection is cut off if authentication is not completed during the prescribed time, such an possible act of illegal utilization cannot be recorded and naturally it is impossible to judge whether intrusion is made actually by illegal action or not.

Further, when wrong passwords are continuously inputted over a prescribed number of times in the system in which when authentication using a password fails the failure is recorded in a log, a lot of failure data in authentication are outputted and other important messages are buried.

Furthermore, since a time interval of counting failures is not provided in the above prior art, intrusion events having an inclination to be generally concentrated in a specific time zone cannot be seized.

When accesses are made from a plurality of places by using an account given to the same person, such acts or events are considered to be illegal utilization, while there is not provided means for detecting such events effectively.

SUMMARY OF THE INVENTION

It is an object of the present invention to provide a method of improving the reliability of detection of an illegal access to a computer system.

It is another object of the present invention to provide a method capable of performing management of occurrent of an illegal access to a computer system effectively.

It is a further object of the present invention to provide a recording medium for storing therein a computer program for detecting an illegal access to a computer system.

According to one aspect of the present invention, the detection method of an illegal access to a computer system according to the present invention, comprises a step a) of collating user identification information inputted from an input unit in one or more log-in operations with user authentication information registered in the computer system, a step b) of detecting the number of times that the identification information is not coincident with the authentication information in a series of log-in operations within a predetermined term, a step c) of obtaining final log-in information indicating whether the identification information is coincident with the authentication information or not in a final log-in operation, and a step d) of comparing the number of times in respect to the incoincidence and the final log-in information with a predetermined judgment standard to thereby detect the presence of the illegal access.

According to another aspect of the present invention, the detection method of an illegal access to a computer system according to the present invention, comprises a step a) of recording user identification information inputted from an input unit in a log-in operation and terminal identification information of a computer terminal in which the log-in operation is performed, a step b) of detecting the number of computer terminals when log-in operations are performed from a plurality of computer terminals by using identical user identification information, and a step c) of judging that there is an illegal access when the number of computer terminals detected in the step b) reaches a predetermined reference value.

According to an aspect of the present invention, in a medium for recording a computer program for detecting an illegal access to a computer system, computer code means comprise means for collating user identification information inputted from an input unit in one or more log-in operations with user authentication information registered in the computer system, means for detecting the number of times that the identification information is not coincident with the authentication information in a series of log-in operations within a predetermined term, means for obtaining final log-in information indicating whether the identification information is coincident with the authentication information or not in a final log-in operation, and means for comparing the number of times in respect to the incoincidence and the final log-in information with a predetermined judgment standard to thereby detect the presence of the illegal access.

Other objects and embodiments of the present invention will become clear from detailed following description taken in connection with the accompanying drawings.

BRIEF DESCRIPTION OF THE DRAWINGS

FIGS. 1A and 1B illustrate an example of normal access and an example of illegal accesses;

FIG. 7 shows an example a monitoring picture screen of a managing computer;

FIG. 8 shows a format of log information; and

FIG. 9 is a flow chart showing processing procedure performed after detection of an illegal access.

DETAILED DESCRIPTION OF THE PREFERRED EMBODIMENTS

Figure 2:
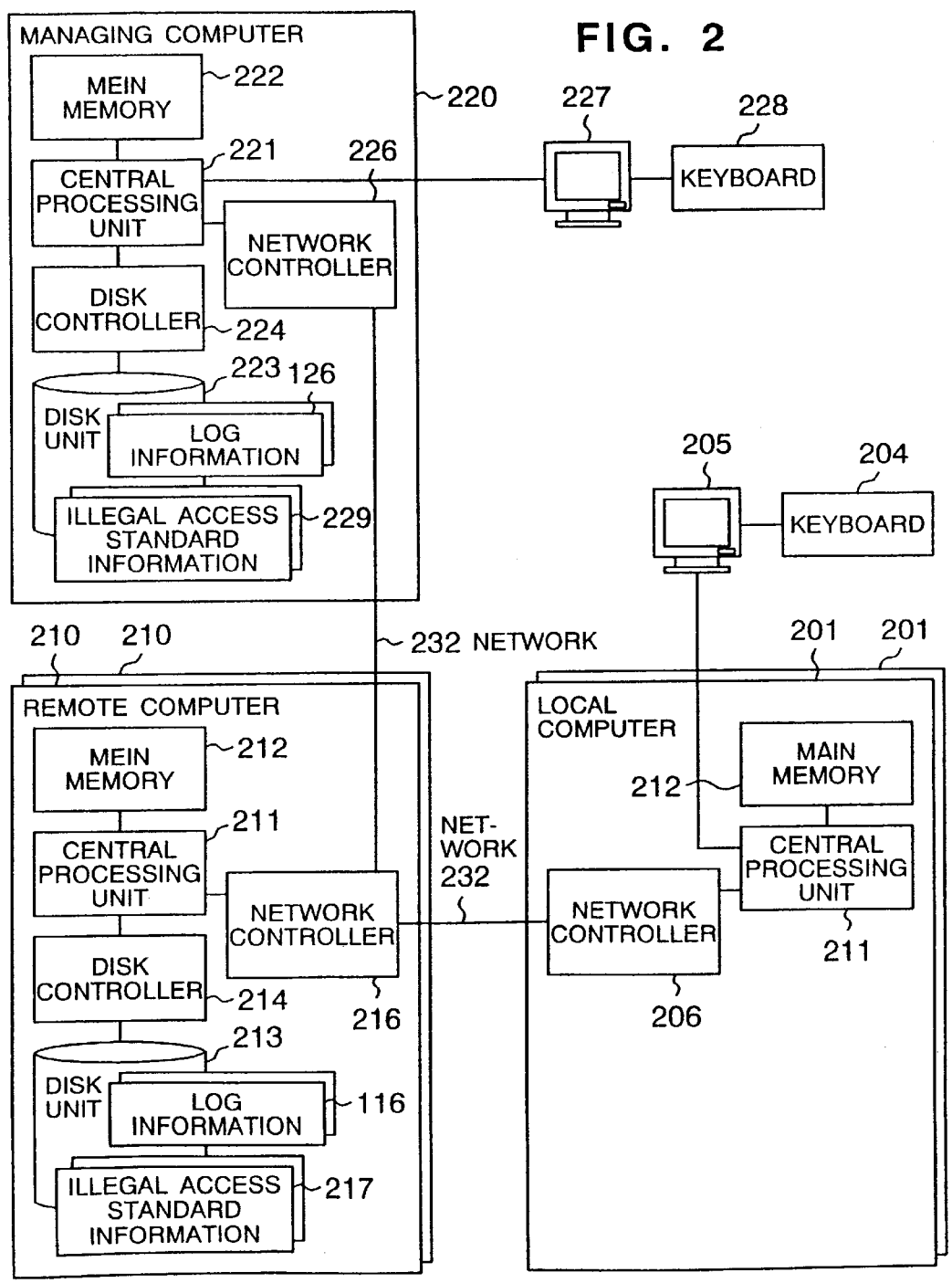
FIG. 2 is a schematic diagram illustrating a computer system to which the present invention is applied.

FIG. 2 schematically illustrates a computer network system according to an embodiment of the present invention. The computer network system includes a plurality of local computers 201 which are directly operated by users, a plurality of remote computers 210 which are remotely operated by users, and a managing computer 220 for managing or controlling the computers 201 and 210, and these computers 201, 210 and 220 are connected to one another through a communication network 232.

There is a case where the managing computer 220, the remote computer 201 and the local computer 201 are constituted by a single computer. In this case, the communication network 232 is a data transmission path within the computer. Further, there is a case where the remote computer 210 and the local computer 201 are constituted by a single computer. Alternatively, there is a case where another combination of computers are constituted by a single computer.

The local computer 201 includes a central processing unit 202, a main memory 203, an input unit 204 such as a keyboard, an output unit 205 such as a display and a network controller 206. Further, the remote computer 210 includes a central processing unit 211, a main memory 212, a disk unit 213, a disk controller 214 and a network controller 215. Moreover, the managing computer 220 includes a central processing unit 221, a main memory 222, a disk unit 223, a disk controller 224, a network controller 225, an input unit 228 such as a keyboard and an output unit such as a display. In addition, the managing computer 220 stores illegal access judgment standard information 229 for judging an illegal access in the disk unit 223 and can transmit the information to the remote computer 210 through the network 232. The remote computer 210 receives the illegal access judgment standard information 229 from the managing computer 220 and stores it as illegal access judgment standard information 217 in the disk unit 213. A user operates the input unit 204 of the local computer 201 and logs in the remote computer 210 through the network to utilize the remote computer. The remote computer 210 is responsive to the log-in operation by the user from the local computer 201 to store an input time 802, a user's name 803 and information 804 as to whether the user could have inputted a password exactly to perform the log-in operation or could have inputted a wrong password not to perform the log-in operation, a name 805 of the local computer 201 and a name 806 of the input unit 204 used together with the local computer, as log information 216, in the disk unit 213.

In the log-in operation, the user inputs the user's name (or user's identification number or code) and the password by means of the keyboard 204. The local computer 201 prepares the log information as shown in FIG. 8 in response to the log-in operation. The log information is transferred to the remote computer 210 or the managing computer 220. Further, the log information is also prepared upon the log-out operation. The log information includes information 801 indicating whether the event is the log-in or log-out operation, the time 802 that the log-in or log-out operation is performed, the user's name (or user's identification number or code) 803, information 804 indicative of success or failure of the log-in or the log-out operation, the name 805 of the computer (log-in computer) which has performed the authentication processing of the user in the log-in operation and a name 806 of the computer (input computer) used directly by the user in the log-in operation. A place of a terminal from which the log-in operation has been performed can be sometimes specified on the basis of the user's name 803, the name 805 of the local computer or the name 806 of the input computer.

When the log-in operation is performed, the local computer 201 collates the user's name which is the user's identification information and a password with right user's name and password in authentication information previously registered in the computer. When the inputted user's name and password are coincident with or agree with the authentication information, the log-in operation is allowed. When the log-in operation is allowed, the information indicative of success of the log-in operation is written in the log information 804.

Further, it is not limited that the log-in operation is performed by the keyboard 204. For example, inputting by an IC card in which the user's identification information is stored, inputting by voice or inputting by designating information displayed in a picture screen of the display 205 by means of a mouse operated by a user may be used to make the log-in operation. Moreover, the picture screen of the display 205 may provide touch panel type input means.

The local computer 201 employs the illegal access judgment standard information 217 to execute the illegal access detection processing described in detail later. When the log-in operation is judged to be the illegal access in the illegal access detection processing, the local computer 201 notifies illegal access information to the managing computer 220 and records it in the disk unit 213. When the managing computer 220 cannot receive the illegal access information, the local computer 201 transmits the illegal access information to the managing computer 220 repeatedly until the managing computer 220 can receives the information. When the managing computer 220 receives the illegal access information, the managing computer records the illegal access information and displays the message in a display console to inform it to the operator.

There are following four different ways for detecting the illegal access.

(1) The local computer 201 detects the existence or absence of a illegal access every time when a log-in event occurs.

(2) The log-in information is transferred from a local computer 201 to a managing computer 220 every time when a log-in event occurs, and the managing computer 220 detects the existence or absence of a illegal access every time when the log-in information is transferred.

(3) The log-in information are stored in a remote computer 210. After a predetermined time or in response to the request from the managing computer 220, the log-in information are transferred from the local computer 201 to the managing computer 220, and the managing computer 220 detects the existence or absence of a illegal access on the basis of the log-in information.

(4) The log-in information are transferred to and stored in a managing computer 220 every time when a log-in event occurs. The managing computer 220 detects the existence or absence of a illegal access on the basis of the log-in information.

Figure 6:
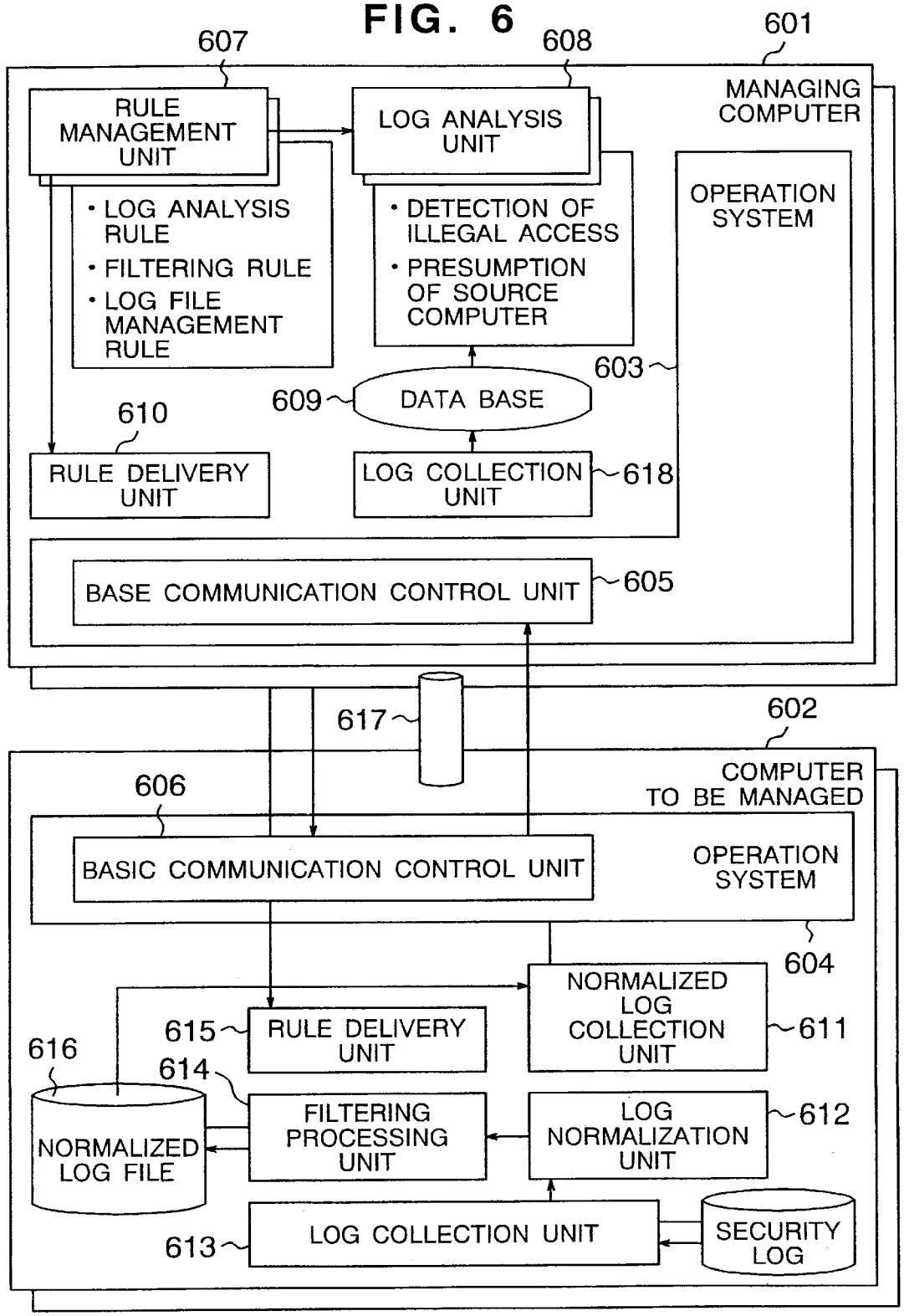
FIG. 6 illustrates a software structure for realizing the present invention.

FIG. 6 illustrates a software structure of an embodiment of the present invention. In the software structure of FIG. 6, the log information is accumulated in the remote computer and the accumulated log information is transferred to the managing computer collectively at a proper timing in the system configuration illustrated in FIG. 2. A managing computer 601 includes components for realizing the functions of the present invention and constructed in an operating system 603 for controlling the hardware of the computer. A rule management unit 607 serves to register, delete or change the above-mentioned illegal access standard information 217 (log analysis rule), the standard (filtering rule) for filtering log information collected in a computer 602 (remote computer 210) to be managed and the standard (log file management rule) for managing the capacity of a data base 609 and a normalized log file 616. A log analysis unit 608 functions to analyze the log information collected from the computer to be managed in accordance with the registered log analysis rule and accumulated in the data base 609. A rule delivery unit 610 controls to deliver the filtering rule and the log file management rule registered in the rule management unit to the computer to be managed and a log collection unit 618 controls to collect log information from the computer to be managed. On the other hand, the local computer 602 to be managed includes components constructed in an operating system 604 to realize the functions of the present invention in the same manner as the managing computer. A log collection unit 613 collects access log gathered by the operating system 604 periodically and converts the collected log into a common format designated previously by a log normalization unit 612. Further, the log collection unit 613 stores only information specified in accordance with the filtering rule designated by the managing computer in a normalized log file 616. A normalized log collection unit 611 transfers the log information converted into the common format to the managing computer at a proper timing (for example, when there is an indication from the managing computer). Further, communication control between the managing computer and the computer to be managed is realized by means of a logical communication path 617 provided by basic communication control units 605 and 606 of the operating systems.

FIGS. 1A and 1B show examples for illustrating the illegal access judgment standard in the present invention. The illegal access judgment standard (217 of FIG. 2) is defined as "when an exact password could be inputted by the number of times smaller than or equal to the prescribed number of times within a prescribed time, the access is normal, otherwise the access is illegal". An example where the prescribed number of times is four times and the prescribed time is one minute is described. In FIG. 1A, all of log-in operations 101 to 104 within one minute starting from the first log-in operation 101 are unsuccessful. Further, log-in operations 102 to 105 within one minute from the second log-in operation are also unsuccessful. However, in a final log-in operation 106 of the log-in operations 103 to 106 within one minute from the third log-in operation, an exact user's name and password are inputted. Accordingly, these operations are regarded as a series of processing and this access 100 is judged to be the exact access. In FIG. 1B, log-in operations 107 to 110 are all unsuccessful and further log-in operations 108 to 111 within one minute from the second log-in operation are also all unsuccessful. Furthermore, log-in operations 109 to 112 within one minute from the third log-in operation are all unsuccessful even in the final log-in operation 112. Thereafter, there is no log-in operation. Accordingly, it is regarded that a series of authentication processing has been finished at the time when one minute elapsed from the third log-in operation and since the log-in operations are unsuccessful within one minute, it is regarded as the authentication being unsuccessful and the access 120 is judged to be illegal.

The above processing includes the method of judging in the real time whether the access is illegal or not when inputting is made by a user and the method of recording user's action in the log and judging whether the access was illegal or not later.

Figure 3:
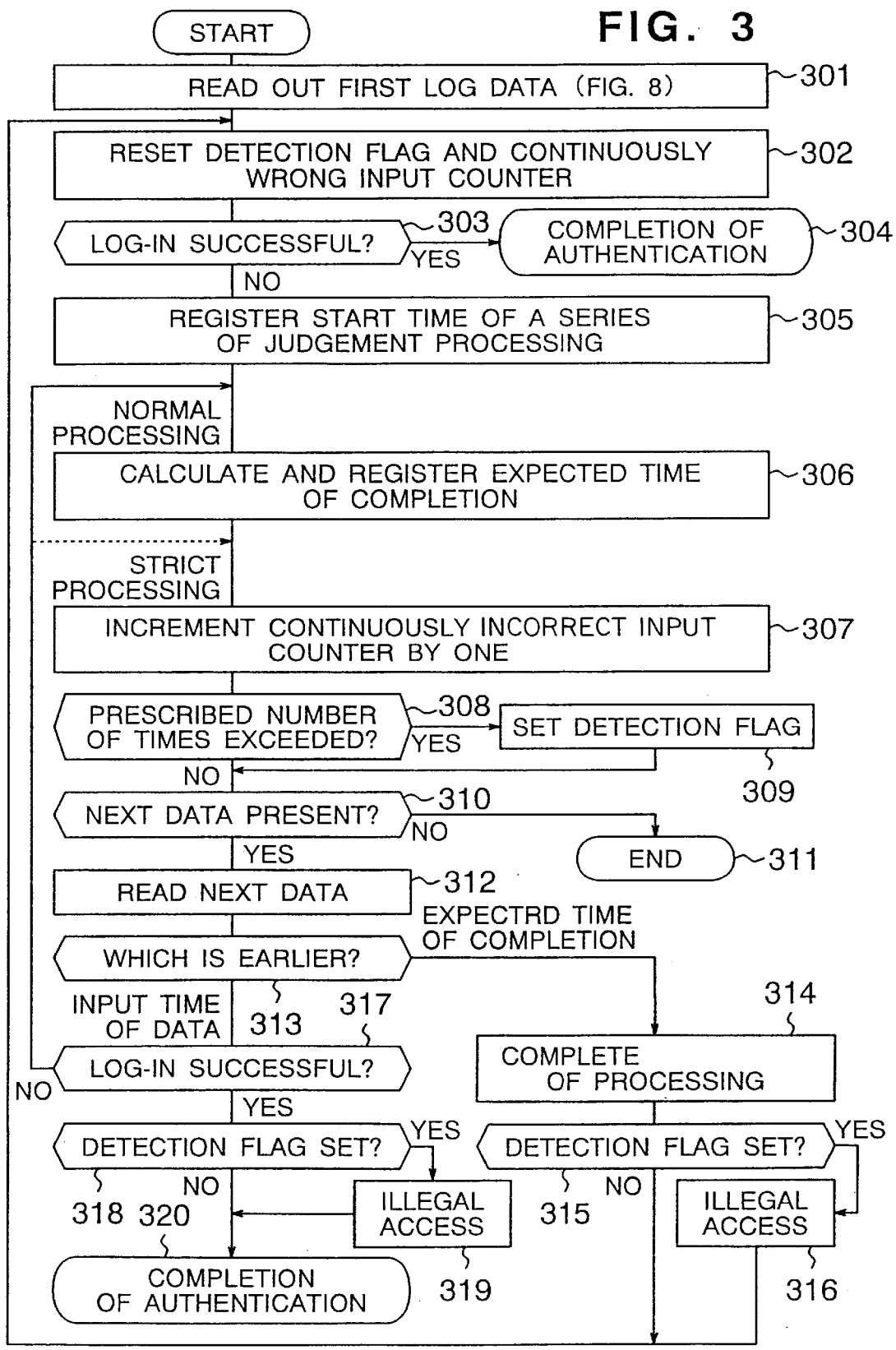
FIG. 3 is a flow chart showing a procedure for detecting an illegal access by considering on the basis of log information whether log-in is successful finally or not.

FIG. 3 shows an example of the above processing procedure. This procedure is considered to be performed by two methods so that in one method the procedure is performed by the log analysis unit 608 of the managing computer and in the other method the procedure is performed by reading out normalized log in the computer to be managed (a processing portion of the latter is not shown in FIG. 6). In this procedure, the log in which the user's action is recorded is read out to thereby judge whether the access is illegal or not. Further, in this procedure, when wrong passwords are inputted by a user, it is not judged from only the number of times of wrong operations occurring continuously that the operations are illegal and whether the operations are illegal or not is judged on the basis of the fact as to whether the final operation of a series of inputting operations (log-in operations) is successful or not. The log format therefor is required to record therein a user's name 803 inputted by the user, judgment result 804 as to whether a password is just or not, and time information 802 that user's inputting is made as shown in FIG. 8. In step 301, first input log data (FIG. 8) is read out. In next step 302, a detection flag indicative of detection of illegal access is reset to an initial value and a wrong input counter is reset to zero. In step 303, it is examined whether the log-in operation is successful or not. When the log-in operation is successful, authentication is completed in step 304. When the log-in operation is unsuccessful, the input time thereof is registered as a start time for a series of processing in step 305. In step 306, the expected time of completion is calculated and registered. In next step 307, the continuously wrong input counter is incremented by one. In step 308, a count of the continuously wrong input counter is examined. When the count is larger than or equal to the prescribed number of times (for example, 4), the detection flag is set in step 309. In next step 310, it is examined whether next log-in data is present or not. When the next log-in data is not present, the process is finished in step 311. When the next data is present, the next data is read in step 312 and a record time or an input time of the next data is compared with the expected time of completion calculated above in step 313. When the expected time of completion is earlier than the input time, it is judged that the series of processing is completed in step 314. In step 315, the detection flag is examined. When the detection flag is set, occurrence of an illegal access is recorded and notified in step 316. Then, the process is returned to step 302 and the above processing is repeated. When the input time of data is earlier than the expected time of completion, it is examined whether the log-in operation is successful or not in step 317. When it is unsuccessful, the process is returned to step 306 and the above processing is repeated. When it is successful, it is examined whether the detection flag is set or not in step 318. When it is set, it is judged that there was an illegal access in step 319. In step 320, the authentication is completed. In the above example, the expected time of completion is calculated again to be updated in step 306. When an illegal access is to be examined more strictly, another method is considered in which the expected time of completion is left as it has been calculated first in step 306 and the update processing is not performed. That is, after the processing in step 317, the process is returned to step 307 as shown by broken line.

Figure 4:
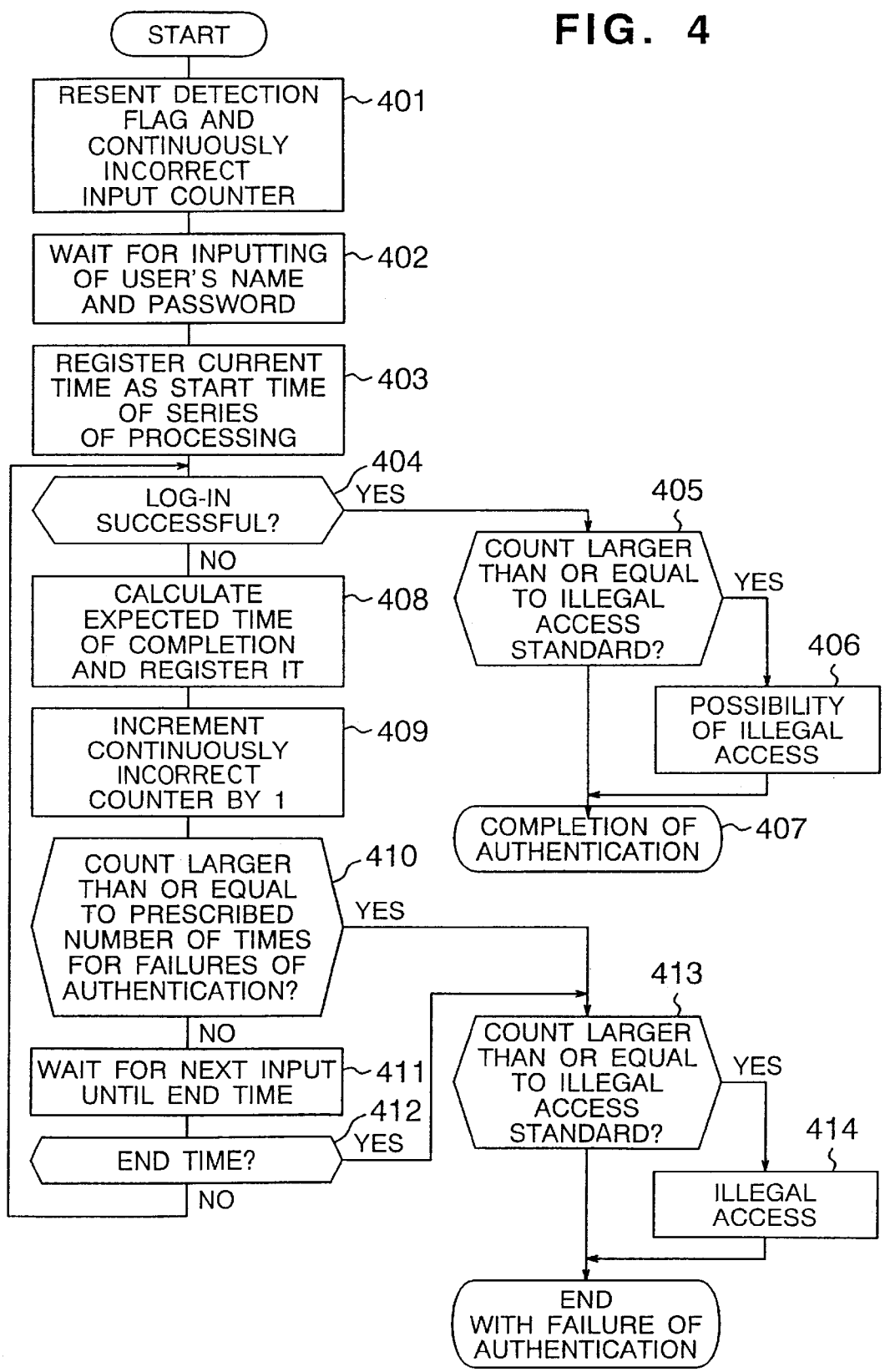
FIG. 4 is a flow chart showing a procedure for detecting an illegal access by considering in real time whether log-in is successful finally or not.

Referring now to FIG. 4, the processing procedure that the illegal access is processed in the real time while gathering log is described. It is considered that this processing procedure is performed by two methods so that in one method the log analysis unit 608 performs the illegal access detection processing every time one log is transferred to the managing computer in each log-in operation in FIG. 6 and in the other method the illegal access detection process is performed every time one log is normalized in the computer to be managed (managing computer) (a processing portion of the latter is not shown in FIG. 6). In the processing procedure performed in the configuration of FIG. 6, first, the detection flag and the input counter are reset in step 401. In next step 402, an event of user's inputting of authentication information including a set of user's name and password by means of the keyboard or the like is awaited. In step 403, an input time is registered as a start time of the series of processing. It is examined whether the user's identification information is coincident with the registered authentication information and the log-in operation is successful or not in step 404. When it is successful, counts of various counters which made counting during the series of processing are read in step 405. When the counts are larger than or equal to the previously defined illegal access standards, it is regarded that there is the possibility that the access is illegal in step 406. In step 407, after an alert is produced and the illegal access is recorded, the authentication is completed. When the log-in operation is unsuccessful, a fixed time is added to the current time to calculate the expected time of completion and register it in step 408. In next step 409, the continuously wrong input counter is incremented by one. In step 410, it is examined whether a count of the continuously wrong input counter is smaller than the prescribed number of times or not. When the count is smaller than the prescribed number of times, inputting of the authentication information (next log) is awaited again until the end time in step 411. After log information has been inputted, it is examined whether the end time is reached or not in step 412. When the input operation has been made before the end time, the process is returned to the judgment step 404 as to whether log-in operation is successful. When the end time is reached or when the number of times for failures of authentication is larger than or equal to the prescribed number of times, the number of times for continuously wrong inputs is examined in step 413. When the number of times for continuously wrong inputs is larger than or equal to the illegal access standards, it is judged that the access is illegal in step 414, so that an alert is produced and the illegal access is recorded in the log. The process is finished as the failure of authentication. The production of the alert is made by displaying occurrence of illegal access on a display screen by a loud color or remarkable shape or on-and-off light information or producing warning sound to notify the illegal access to the manager positively.

An illegal access detection method according to a further embodiment of the present invention is now described. The illegal access judgment standard (217 of FIG. 2) in this embodiment is defined as "it is judged that there is illegal utilization when log-in operations have been made by the same user's name from a plurality of different terminals (local computers)". This procedure is considered to be performed by two methods so that in one method the procedure is performed by the log analysis unit 608 of the managing computer and in the other method the procedure is performed by reading out normalized log in the computer to be managed (a processing portion of the latter is not shown in FIG. 6). One user can exist at only one place geographically. For example, one user cannot touch or use terminals provided in Tokyo and Osaka at the same time. When log-in operations performed in two or more different places are detected, it is considered that illegal access is made. That is, when log-in operations are made to one machine from a plurality of terminals through a network, it is considered that the operations are made by an illegal user. The illegal access judgment standard information including information relative to geographical positions where terminals are located, information relative to judgment as to whether operations performed by a plurality of terminals used at the same time are illegal access or not (considering areas where the plurality of terminals are located), information relative to the number of terminals used at the same time to perform operations that are considered as illegal utilization and information relative to combination of the above information or conditions is previously prepared and stored in the memory. First, description is made to the processing of inspecting whether there is illegal utilization or not on the basis of data recorded in log. Log data includes, as shown in FIG. 8, information relative to user's name, discrimination of log-in information or log-out information and position of a used terminal. The position information of the terminal is to specify a place where an input terminal such as an actual keyboard is located as an input source when log-in information is transmitted through a multi-stage of network. However, when the position information of the terminal cannot specify the place, place information of a terminal which has made latest inputting is sometimes used instead while understanding reduction of detection accuracy. Further, information relative to a terminal being used currently is recorded for each user in a work area used in detection processing.

Figure 5:
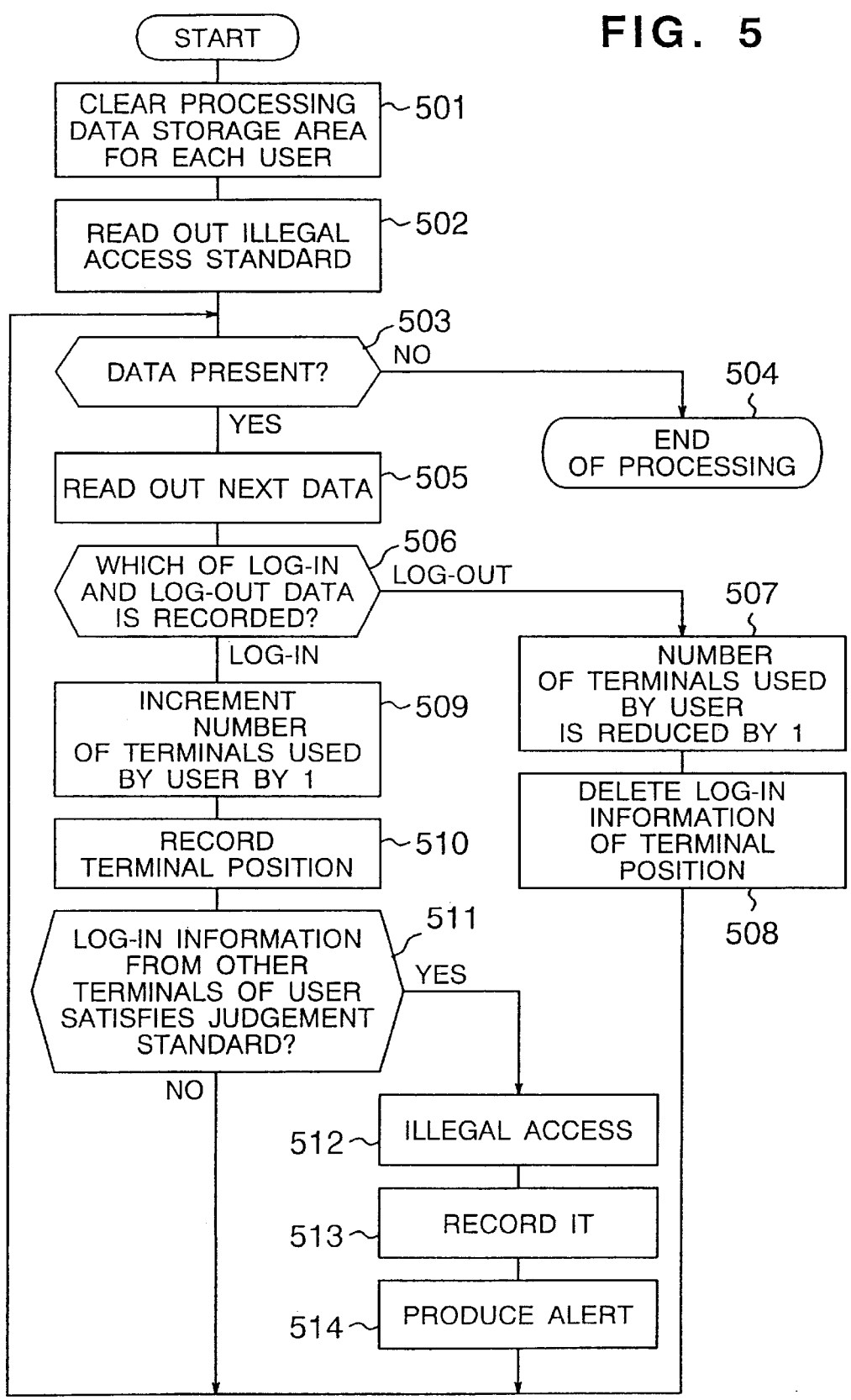
FIG. 5 is a flow chart showing a procedure for investigating intrusion from a plurality of places on the basis of log information to detect an illegal access.

FIG. 5 is a flow chart showing the above log analysis processing procedure. This processing procedure is performed by two methods including one method in which the log analysis unit of the managing computer successively reads out the log from the data base to perform judgment as to an illegal access and the other method in which each time the log-in/log-out operation is performed in the local computer, judgment as to an illegal access is performed while referring to the log information outputted in the disk unit in the real time. In first step 501, the work area is cleared. In next step 502, the illegal access standard is read out from the memory unit. In step 503, it is judged whether there is log data which are not processed yet or not. When all of data have been processed already, the processing is finished in step 504. When data remain still, first log-in data is read out from recorded log information in step 505. In next step 506, it is examined whether the read data is log-in data or log-out data. When the read data is the log-out information, In step 507, a recorded value of the number of terminals used by the user is decremented by one. In step 508, log-in information from the terminal position is deleted and the process is returned to step 503. When the read data is the log-in information, the recorded value of the number of terminals used by the user is incremented by one and the position of the terminal used by the user is recorded in step 510. In step 511, the number of terminals and the position information of terminals used by the user and previously registered geographical information of terminals are collated with the illegal access standard. When it is judged that the log-in operation is illegal in step 512, it is recorded in step 513 and an alert is produced in step 514. Then, the process is returned to step 503 and the above procedure is repeated.

More particularly, the above embodiment is performed by following two methods in brief. When the log-in operations are performed by a plurality of different computer terminals with the same user identification information (user's name and/or password), the number of computer terminals is detected. In a first method, it is judged that there is an illegal access when the detected number of computer terminals reaches a predetermined reference value. In a second method, the number of computer terminals in case where the log-in operations are performed by the plurality computer terminals with the same user identification information is detected. Further, position information which specifies a place or places of the computer terminals which have performed the log-in operations is recorded. It is detected whether the place or places of the computer terminals are coincident with the predetermined registered place or places or not. It is judged that there is an illegal access when the number of computer terminals which have performed the log-in operations exceeds the predetermined reference value and it is detected that the place or places of the computer terminals are not coincident with the predetermined place or places.

Further, in the above processing procedure, the illegal access judgment standard can be extended as "it is regarded that there is illegal log-in operation only when the number of terminals utilized at the same time continuously during a specified time is larger than or equal to a predetermined value" and "it is regarded that there is illegal log-in operation when the number of terminals utilized at the same time in a specified time zone is larger than or equal to a predetermined value".

FIG. 7 shows an example of a picture on a display console of the managing computer for reporting illegal accesses. Numeral 702 denotes a picture indicating a connecting relation of the computers to be managed positioned in the network and states of the computers displayed by respective colors in symbols expressing the computers. Numeral 701 denotes a picture displaying messages of occurred events in the time series manner. For example, in third and fourth lines, messages indicating occurrence of illegal access are displayed. When a computer is specified (for example, computer B), the color in the symbol thereof is changed to notify the computer to the manager. Further, when it is desired to understand detailed contents of the illegal access, a detailed picture 703 is displayed by operation for selecting a menu attached to the picture 701.

In the managing computer, after an illegal access has been reported by any processing of FIGS. 3 to 5, a previously designated operation can be instructed to a specific computer (generally, the computer in which the illegal access has been detected).

For example, the operation is performed by a processing program for deleting information of the user who performed illegal access from registered information, for prohibiting an access using the identification information (user's name, code or the like) of the user who performed illegal log-in operation, for invalidating to use the identification information or for limiting the use condition thereof.

There are considered two methods including one method in which the processing program is previously incorporated into each of the computers and the other method in which the processing program is delivered to the computer from the managing computer when the program is required and is executed in the computer. This procedure is now described with reference to FIG. 9. In step 902, when the managing computer detects an illegal access, it is examined whether a countermeasure processing operation to the reported illegal access is defined or not and when it is defined, the countermeasure information is read out in step 903. In next step 904, it is examined whether the processing program for executing the processing operation is stored in the computer to be managed or not. When the program is stored therein, only the parameter necessary for the processing is transferred to the computer to be managed in step 905 and when the program is not stored therein, the necessary parameter is transferred to the computer to be managed together with the processing program for executing the processing operation in step 906. The computer to be managed executes the designated processing program in step 907 and transfers a result of the execution to the managing computer in step 908.

Further, when an illegal access is reported to the managing computer, a method is considered in which a monitoring program is delivered to the computer in which the illegal access has occurred so that the computer monitors the previously designated program for the purpose of collection of detailed information and monitoring of detailed state (for example, file updating circumstances, process operating circumstances and the like). This procedure can be also performed in accordance with the procedure shown in FIG. 9.

Moreover, the program for disconnecting a line of the local computer in which the illegal log-in has occurred and the terminal thereof can be transmitted by the processing of FIG. 9.

According to the detection method of an illegal access according to the present invention, the reliable examination or inspection as to whether a user is a proper user or unauthorized user can be performed to thereby reduce misdetection of an unauthorized user and wrong detection of a proper user.

Further, since pertinent events are unified into one group from a large number of events to be reported to the manager, an amount of information to which the manager pays the attention can be reduced.

In addition, when an illegal access is detected, a countermeasure for deleting user information having a problem, processing for collecting detailed information and the like can be performed for the computer of interest automatically.

What is claimed is:

1. A detection method of an illegal access to a computer system, comprising the steps of:
   a) collating user identification information inputted from an input unit in one or more log-in operations with user authentication information registered in said computer system;
   b) detecting the number of times that said identification information is not coincident with said authentication information in a series of log-in operations within a predetermined term;
   c) obtaining final log-in information indicating whether said identification information is coincident with said authentication information or not in a final log-in operation; and
   d) comparing said number of times in respect to the incoincidence and said final log-in information with a predetermined judgment standard to thereby detect the presence of the illegal access.

2. A method according to claim 1, wherein when a plurality of events for accessing have been occurred and the latest event is determined to be one event included in a series of preceding events in consideration of a time information and user authentification information, those events are reported together as one event with a warning so as to reduce the number of warnings to be monitored by a user.

3. A method according to claim 1, further comprising the step of setting said predetermined term for each log-in operation when there are a plurality of log-in operations.

4. A method according to claim 3, wherein said series of log-in operations is defined to include log-in operations performed until the final log-in operation is successful or until the number of times of failures in the log-in operations within said predetermined term does not reach a predetermined value while successively shifting said predetermined term every log-in operation.

5. A method according to claim 3, wherein it is judged that there is an illegal access when it is detected that the number of times in respect to the incoincidence reaches a predetermined number of times in said series of log-in operations within said predetermined term and said final log-in information represents the incoincidence.

6. A method according to claim 5, wherein said computer system includes a plurality of user computers and a managing computer connected to said user computers through a communication network for managing said user computers, and said user computer performs said steps a), b), c) and d) each time the log-in operation is performed to transfer judgment result of said step d) to said managing computer through said communication network.

7. A method according to claim 5, wherein said computer system includes a plurality of user computers, a managing computer for managing said user computers and a communication network connecting said plurality of user computers and said managing computer, and said user computer performs said steps a), b) and c) to transfer result information of said steps a), b) and c) relative to all of log-in operations through said communication network to said managing computer, which performs said step d) on the basis of said transferred information.

8. A method according to claim 7, wherein when an illegal access is detected in said step d), a processing program to be next executed is transferred through said communication network to said user computer in which said illegal access is made and said user computer performs said processing program.

9. A method according to claim 8, wherein said processing program to be next executed includes processing for limiting or invalidating use of said user authentication information registered in said computer system.

10. A method according to claim 7, further comprising the step of displaying said plurality of user computers connected to said managing computer in a picture screen of a display unit by means of an icon image and displaying in said display screen, when an illegal access is detected in said step d), a user computer in which said illegal access is made so that said user computer can be specified.

11. A computer program product comprising:
   a computer usable medium having computer readable program code means embodied in said computer usable medium for detecting an illegal access to a computer system, said computer readable program code means comprising:
      means for collating user identification information inputted from an input unit in one or more log-in operations with user authentication information registered in said computer system;
      means for detecting a number of times that said user identification information is not coincident with said user authentication information in a series of log-in operations within a predetermined time;
      means for obtaining final log-in information indicating whether said identification information is coincident with said authentication information in a final log-in operation; and
      means for comparing the number of times with respect to the incoincidence and said final log-in information with a predetermined judgment standard to thereby detect the presence of the illegal access.

12. A computer program product according to claim 11, wherein said series of log-in operations is defined to include log-in operations performed until the final log-in operation is successful or until the number of times of failures in the log-in operations within said predetermined time does not reach a predetermined value while successively shifting said predetermined time every log-in operation.

13. A computer program product according to claim 11, wherein said illegal access is detected when the number of times with respect to the incoincidence reaches a predetermined number of times in said series of log-in operations within said predetermined time and said final log-in information represents the incoincidence.

14. A computer program product according to claim 11, wherein said computer system includes a plurality of user computers, and a managing computer connected to said user computers through a communication network for managing said user computers.

15. A computer program product according to claim 14, wherein said computer readable program code means further comprises means for enabling a visual display of said plurality of user computers connected to said managing computer on a display screen by means of an icon image, when said illegal access is detected.

16. A computer program product according to claim 11, wherein said computer readable program code means further comprises means for enabling a visual display of said plurality of user computers connected to said managing computer on a display screen by means of an icon image, when said illegal access is detected.

* * * * *